United States Patent
Barks

(10) Patent No.: US 6,324,757 B1
(45) Date of Patent: Dec. 4, 2001

(54) METHOD OF REPAIRING AN ENGINE COOLING SYSTEM

(75) Inventor: Robert W. Barks, New Castle, DE (US)

(73) Assignee: SCIX, LLC, Bensalem, PA (US)

( * ) Notice: Subject to any disclaimer, the term of this patent is extended or adjusted under 35 U.S.C. 154(b) by 0 days.

(21) Appl. No.: 09/476,265

(22) Filed: Jan. 3, 2000

Related U.S. Application Data

(63) Continuation-in-part of application No. 09/227,440, filed on Jan. 8, 1999, now Pat. No. 6,159,276.

(51) Int. Cl.$^7$ .................................................. B23P 15/26
(52) U.S. Cl. ............................. 29/888.011; 29/890.031; 29/402.02
(58) Field of Search ........................ 29/888.011, 402.01, 29/402.02, 890.31; 106/33; 252/72

(56) References Cited

U.S. PATENT DOCUMENTS

| | | |
|---|---|---|
| 2,129,459 | 9/1938 | Benoit . |
| 2,315,321 | 3/1943 | Evans et al. . |
| 2,729,568 | 1/1956 | Metcalf . |
| 2,885,296 | 5/1959 | Welden . |
| 3,042,620 | 7/1962 | Dry et al. . |
| 3,417,018 | 12/1968 | Burns . |
| 3,433,655 | 3/1969 | Nugent . |
| 3,644,208 | 2/1972 | Krueger . |
| 3,740,337 | 6/1973 | Sommers . |
| 3,984,507 | 10/1976 | Miller . |
| 4,524,159 | 6/1985 | Barber . |
| 4,708,195 | 11/1987 | Barks . |
| 4,713,114 | 12/1987 | Smith . |
| 4,765,629 | 8/1988 | Barks . |
| 4,765,630 | 8/1988 | Barks . |
| 4,973,360 | 11/1990 | Satas . |
| 5,282,895 | 2/1994 | Phillips . |
| 5,391,224 | 2/1995 | Pasuit et al. . |
| 6,159,276 | * 12/2000 | Barks ..................................... 106/33 |

FOREIGN PATENT DOCUMENTS 62227968   10/1987   (JP) .

* cited by examiner

Primary Examiner—I Cuda-Rosenbaum
(74) Attorney, Agent, or Firm—Douglas G. Glantz

(57) ABSTRACT

A method of repairing a coolant system associated with an engine for a vehicle, including disconnecting a gooseneck connected to said engine and removing from said engine its thermostat; disconnecting a bottom radiator hose connected to said engine and flushing said engine with water; reconnecting said bottom radiator hose and reconnecting said gooseneck; refilling said engine's radiator with an antifreeze solution; opening a drain valve on said radiator and allowing a predetermined amount of coolant to drain out of said engine corresponding to a volume of a treatment composition to be added, said treatment composition comprising an aqueous silicate mixture comprising 5–80% sodium silicate, based on a total amount of silicates in said mixture, and 50–20% potassium silicate, based on said total amount of silicates in said mixture, said total amount of silicates comprising about 40–50% of said mixture, a glycol in an amount of at least 10% by volume of the composition and the balance being water; starting said engine when said engine is cold, and turning on said engine's heater; adding said composition to said radiator of said engine while said engine is cold and idling; running said engine until said composition causes leakage and/or vapor in said engine's exhaust stream is substantially stopped; and stopping said engine and allowing said engine to cool.

3 Claims, No Drawings

METHOD OF REPAIRING AN ENGINE COOLING SYSTEM

This application is a continuation-in-part of U.S. patent application Ser. No. 09/227,440, filed Jan. 8, 1999, now U.S. Pat. No. 6,159,276.

BACKGROUND OF THE INVENTION

This invention relates to a method and composition for repairing cooling systems of combustible engines and the like and particularly for sealing cracks in such devices as heating cores, freeze plugs, radiators, cracked or warped heads and blown head gaskets. The most common approach generally taken to repair such cracks is to utilize solid particles carried by a liquid for conveying the particles to the cracks. In this conventional approach the solid particles act as plugs for sealing the cracks. A difficulty with this conventional approach is that it is applicable only to large cracks with varying effectiveness but is not effective with respect to very small cracks which are too small for the particles to enter. Another disadvantage with such conventional techniques is that such techniques operate too slowly.

A variation of the above-conventional techniques which have been considered is to completely omit the solid particles as the sealant and instead to use as the sealant a pure liquid. In this variation the liquid flows into all cracks and openings whether large or minute. The components of the liquid are such that upon the application of heat, such as by starting the engine, the liquid solidifies and thereby is intended to close or seal the cracks.

OBJECTS OF THE INVENTION

An object of this invention is to provide an improved sealing system which has the advantages but not the drawbacks of the above systems.

A further object of this invention is to provide such a sealing system which provides sufficient strength and durability to effectively withstand pressure that might be applied.

A still further object of this invention is to provide such a system which is characterized by its quickness in sealing cracks regardless of the size of the cracks.

SUMMARY OF THE INVENTION

In accordance with one embodiment of this invention the sealing system includes a liquid carrier for solid particles. Unlike the conventional system, however, the liquid carrier itself is capable of solidification. Thus, the invention utilizes the advantages of the prior techniques by initially closing large cracks and openings with the solid particles and utilizing the liquid to fill the tiny cracks and to complete the filling of the large cracks upon solidification of the liquid.

In another embodiment of this invention, the sealant may comprise a mixture of sodium silicate, potassium silicate, a glycol, and particulates, with optional coloring agents and preservatives.

Another embodiment of this invention comprises a method of repairing a coolant system associated with an engine for a vehicle including disconnecting a gooseneck connected to said engine and removing from said engine its thermostat; disconnecting a bottom radiator hose connected to said engine and flushing said engine with water; reconnecting said bottom radiator hose and reconnecting said gooseneck; refilling said engine's radiator with an antifreeze solution; opening a drain valve on said radiator and allowing a predetermined amount of coolant to drain out of said engine corresponding to a volume of a treatment composition to be added, said treatment composition comprising an aqueous silicate mixture comprising 50–80% sodium silicate, based on a total amount of silicates in said mixture, and 50–20% potassium silicate, based on said total amount of silicates in said mixture, said total amount of silicates comprising about 40–50% of said mixture, a glycol in an amount of at least 10% by volume of the composition and the balance being water; starting said engine when said engine is cold, and turning on said engine's heater; adding said composition to said radiator of said engine while said engine is cold and idling; running said engine until said composition causes leakage and/or vapor in said engine's exhaust stream is substantially stopped; and stopping said engine and allowing said engine to cool.

DETAILED DESCRIPTION

In its broadest aspect the invention is directed to providing a composition for effectively sealing holes or cracks in engine cooling systems and the like, and to seal warped engine heads, and the like. The invention provides a liquid composition which may be solidified to seal cracks, holes and warped areas. The composition may also include pumice particles or metal filings, coloring agents and preservatives. The solid particles function as bonding agents to which the liquid becomes attached while solidifying. The solidification of the carrier can take place in any suitable manner. For example, a reactant or catalyst can be added to the liquid carrier immediately after time of insertion and thereby utilize a chemical reaction to cause solidification. In the preferred form of this invention, however, the solidification takes place as a result of heat being applied to the liquid carrier.

By utilizing heat to cause solidification the invention is particularly useful for sealing cracks or holes in a combustible engine in its cooling system. For example, the invention may be utilized for sealing cracked or warped heads or blown head gaskets in an engine or for sealing heating cores, freeze plugs, radiators or in the cooling system. The engine or cooling system may be of a gasoline or diesel type such as those used vehicles such as cars, trucks, boats, and the like.

In this invention, a liquid part of sealant is obtained by mixing sodium silicate and potassium silicate in liquid form, to which is added a glycol and water. The liquid may also contain various coloring agents and preservatives. In some applications, the liquid may also contain particulates such as pumice or corrosion-resistant metal filings.

The silicates of the present composition are comprised of potassium silicate and sodium silicate. The silicates are high grade silicates and may be mixed in specific proportions. For example, sodium silicate may be present in 10–90% based on the total amount of the silicates, more preferably 50–80% based on the total amount of silicates, the balance of the silicates being comprised of potassium silicate. The total amount of silicates comprise about 40–50% of the aqueous silicate mixture.

Sodium silicate or water glass may be pure sodium metasilicate or mixtures of sodium metasilicate with two other silicates. It is available as granular, crystals or 40% Baume solution. The N Grade liquid is preferred.

Sodium silicate is a general term applied to a group of materials. They are compositions in which sodium oxide is combined with various amounts of silica usually with some water. They differ in $SiO_2/Na_2O$ ratio and in the amount of water attached. Sodium silicates are available in $SiO_2/Na_2O$ from 0.5 to 4. The number of water molecules per one molecule of sodium silicate may vary from 0 to 10.5.

The silicate mixture of the present invention is provided in liquid form. The potassium silicate of the present invention may be $K_2SiO_3$, $K_2Si_2O_5$, and/or $K_2Si_4O_9$. Preferably, the potassium silicate is present in liquid form, such as solublized in water. The potassium silicate of the invention may be in a 40% solution, or any soluble form commonly available. The amount of potassium silicate suitable for use in the present invention is from about 10–90% based an the total amount of silicates, more preferably, 20–50% based on the total amount of silicates. The balance being comprised of sodium silicate.

The composition also contains a glycol in water. Suitable glycols for use in the invention include diethylene glycol, ethylene glycol, propylene glycol, dipropylene glycol, polyglycols, glycol ethers, and mixtures thereof. Of the glycols which may be used in the invention diethylene glycol is preferred. Glycols provide a composition with a low freezing point and lubrication for the water pump. A composition containing about 12–15 wt % glycol, for example, may be used in climates with temperatures down to about –10° F. (about –23° C.). In a preferred embodiment of the invention, the glycol component comprises 1–25 wt % of the composition. More preferably, the diethylene glycol and water comprises 5–25 wt % of the total composition. Most preferably, the diethylene glycol and water comprises 10–15 wt % of the total composition. The diethylene glycol is particularly advantageous since this additive allows for a cooler running system and helps the hardening effect of the sealant.

The composition may optionally contain particulates such as pumice or corrosion-resistant metal filings. The pumice particles should be small enough to pass through a heating core of the engine in need of sealing. In general, pumice is added to the composition for heavy-duty applications such as for sealing warped heads. Pumice particles are preferably added in an amount of about 1 teaspoon per pint. Metal filings, such as brass filings, copper filings, or aluminum filings may also be used in the composition. The metal filings have the advantage of not rusting. Metal filings should also be sized to pass through the heating core of the engine to be treated. The amount of metal filings is preferably about ½ of a level teaspoon per pint.

The invention may also comprise coloring agents and preservatives.

In a preferred embodiment of the invention, approximately 5.3 fluid ounces (about 150 mL) of sodium silicate solution is mixed with about 2 fluid ounces (about 59 mL) of potassium silicate. To this mixture, 2 fluid ounces (about 59 mL) of a glycol, such as diethylene glycol or ethylene glycol are added and 6.7 fluid ounces (about 205 mL) of water complete the 16 ounce (about 473 mL) solution. If desired, pumice (1 tsp) or metal filings (½ tsp) may be added for severe cracks, such as for sealing warped heads and blown head gaskets. The viscosity of the product resembles a light grade motor oil. This final mixture is then bottled in an amount intended for single use, or multiple uses. For single use bottles, the amount of the composition is preferably about 1 pint (473 mL). This final mixture is added to the cooling system of a car, for instance.

The cooling system of a modern car has 10 to 20 quarts (9.5 to 19 L) coolant capacity. The mixture within the cooling system is, therefore, from about 2.5 to 5% silicate by volume.

It is understood that the invention may be practiced with other amounts of these materials or with the substitution of other materials. The preferred example, however, is particularly suitable because it results in solidification quickly taking place upon the reaching of the predetermined temperature. For example, when a temperature of about 150–190° F. (about 65–88° C.) is reached, solidification takes place in as little as about 5–10 seconds.

Advantageously, the high temperature necessary for solidification is obtained by starting the engine to thereby heat the engine. In order to use the composition to substantially seal cracks in an engine coolant system and to seal warped heads, the sealant is preferably poured into a cold radiator so that by the time the engine is turned on the sealant has already flowed into the block and filled the cracks. Preferably, the thermostat is removed when using the composition. Once the composition has been added to the coolant system and allowed to flow into the block, the engine is started to allow the engine to warm up. Alternatively, the composition may be added to a running engine provided it is added when the engine is cold. The engine is preferably allowed to run with the heater turned to maximum. The warmth of the engine allows the composition to seal gaps, spaces and cracks. After the leaking stops, the engine should be stopped and allowed to cool. The sealant has now formed a substantially permanent barrier and the leak is cured.

In many cases, leaks can be detected when the engine is running. Visible vapor may come from the exhaust. A warped head or broken block may allow coolant to leave the block in a visible stream or drops. Sealing takes about ten minutes and may usually be visibly confirmed by the absence of the vapor or liquid previously noticed.

In an especially preferred embodiment, the composition is used as follows:

(1) The engine gooseneck is disconnected and the thermostat removed. The engine is then flushed with water after removing the bottom radiator hose. A flushing agent should not be used.

(2) The bottom radiator hose is replaced and the gooseneck is reconnected, preferably with a new gasket and sealer. The cooling system is then refilled with antifreeze mixture (preferably factory recommended, typically 50% antifreeze and 50% water).

(3) The appropriate amount of composition is determined based on the number of cylinders in the engine: for a 4cylinder engine, about 16 oz. is preferred; for a 6 cylinder engine, about 24 oz. is preferred; for an 8 cylinder engine, about 32 oz is preferred.

(4) The petcock is opened so that enough coolant is drained to allow the appropriate amount of composition to be added. For engines with only a reservoir feed into the radiator, enough coolant must be drained so that the recommended amount of composition does not remain in the reservoir.

(5) The engine should be cold. The motor is then started and the heater is turned on to maximum. The composition should be shaken or stirred to thoroughly mix the contents of the composition.

(6) While the engine is cold and idling, the composition should be added into the radiator. The radiator cap is preferably left off. The engine should be held at about 1000 rpm for about 15–30 minutes, or until the leak and/or vapor has stopped. The engine should be allowed to run until the composition completely seals. For severe conditions, about 25% more composition may be used.

(7) If liquid is being pushed out through the radiator cap opening, the cap may be replaced. However, the cap should not be replaced under pressure unless it is necessary to stop the overflow. It is preferred to maintain the radiator level of coolant. Therefore, one may add coolant mix, if necessary to maintain the appropriate level of coolant in the radiator and avoid overheating.

(8) Once leaking has stopped, the engine should be stopped and allowed to cool.

(9) After about 10hours of driving, a new thermostat may be installed. Thereafter, the vehicle may be operated normally.

If desired, a slightly larger quantity of water can be used. However, the mixture of the water and silicates in the amounts indicated gives best results. It is preferred that the water and silicates are mixed together before being mixed with the glycol because the glycol will promote immediate solidification. If solid particles are included, it is possible to seal leaks at temperatures less than about 37° C. with this mixture.

The invention is characterized by a seal having great strength and integrity sufficient to withstand the normal pressures to which it would be subjected. A particularly great advantage is the quickness or speed in which the sealing action takes place. A further advantage is the ability of the sealant to penetrate tiny cracks and thereby prevent such cracks from getting larger.

In general, the invention applies to sealing any type of cracks wherein liquid may flow into the cracks. As noted above, such cracks would then be effectively sealed in a rapid period of time. The cracks may be in combustible engine cooling systems or may be in other devices such as home or building heating systems.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

An advantage of this variation is that it permits the sealing of cracks or leaks at lower temperatures than with the first embodiment. Additionally, the particular mixture of components which includes ethylene glycol permits the provision of anti-freeze which is ordinarily already in the engine to function as a source of the ethylene glycol.

The invention in its various embodiments thus provides a sealant which is particularly effective for cracks and leaks at various ranges of temperatures.

What is claimed is:

1. A method of repairing a coolant system associated with an engine for a vehicle, comprising:

(a) disconnecting a gooseneck connected to said engine and removing from said engine its thermostat;

(b) disconnecting a bottom radiator hose connected to said engine and flushing said engine with water;

(c) reconnecting said bottom radiator hose and reconnecting said gooseneck;

(d) refilling said engine's radiator with an antifreeze solution;

(e) opening a drain valve on said radiator and allowing a predetermined amount of coolant to drain out of said engine corresponding to a volume of a treatment composition to be added, said treatment composition comprising an aqueous silicate mixture comprising 50–80% sodium silicate, based on a total amount of silicates in said mixture, and 50–20% potassium silicate, based on said total amount of silicates in said mixture, said total amount of silicates comprising about 40–50% of said mixture, a glycol in an amount of at least 10% by volume of the composition and the balance being water;

(f) starting said engine when said engine is cold, and turning on said engine's heater;

(g) adding said composition to said radiator of said engine;

(h) running said engine until said composition causes leakage and/or vapor in said engine's exhaust stream to substantially stop;

(i) stopping said engine and allowing said engine to cool.

2. The method of claim 1, wherein said vehicle is an automobile.

3. The method of claim 1, wherein said heater is turned on to a maximum setting.

* * * * *